United States Patent [19]

Miller

[11] 4,407,089
[45] Oct. 4, 1983

[54] FISHING ROD HOLDER

[76] Inventor: Joseph A. Miller, 2308 N. 23rd St., Lafayette, Ind. 47904

[21] Appl. No.: 248,404

[22] Filed: Mar. 27, 1981

[51] Int. Cl.³ .......................................... A01K 97/10
[52] U.S. Cl. .................................................. 43/21.2
[58] Field of Search ................. 43/21.2; 248/520, 530, 248/532, 533, 538; 224/922

[56] References Cited

U.S. PATENT DOCUMENTS

| | | | |
|---|---|---|---|
| 2,311,823 | 2/1943 | Gaskill | 43/21.2 |
| 2,652,999 | 9/1953 | Lohmar | 248/530 |
| 3,074,674 | 1/1963 | Hill | 248/538 |
| 3,154,274 | 10/1964 | Hillcourt | 43/21.2 |
| 4,031,651 | 6/1977 | Titze | 43/21.2 |
| 4,344,248 | 8/1982 | Brophy | 43/21.2 |

Primary Examiner—Nicholas P. Godici
Assistant Examiner—Marc Hodak
Attorney, Agent, or Firm—Barnes & Thornburg

[57] ABSTRACT

Convenience fishing rod attachments enable a fisherman to leave multiple fishing rods unattended without concern that the rods may be pulled into the water by fish strikes, and subsequently lost or damaged. The attachments permit such unattended use of a fishing rod in a boat or on a bank or shore of a body of water. One of the attachments provides a system by which a hook is automatically set in the mouth tissue of a striking fish.

6 Claims, 9 Drawing Figures

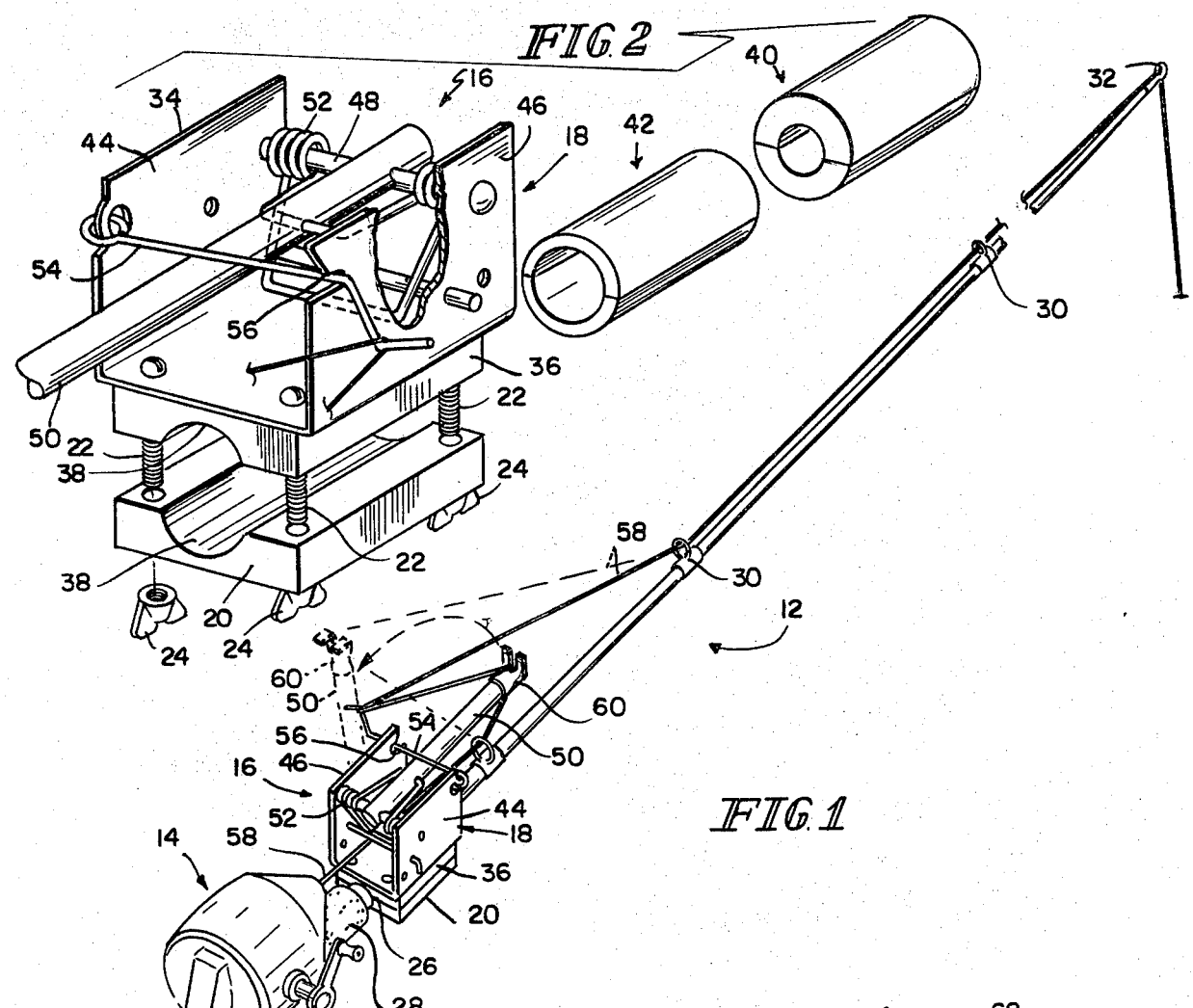
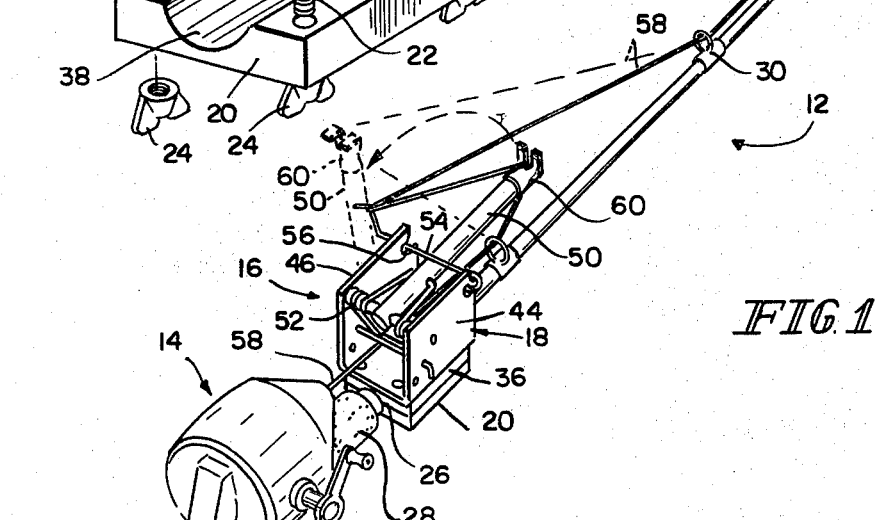
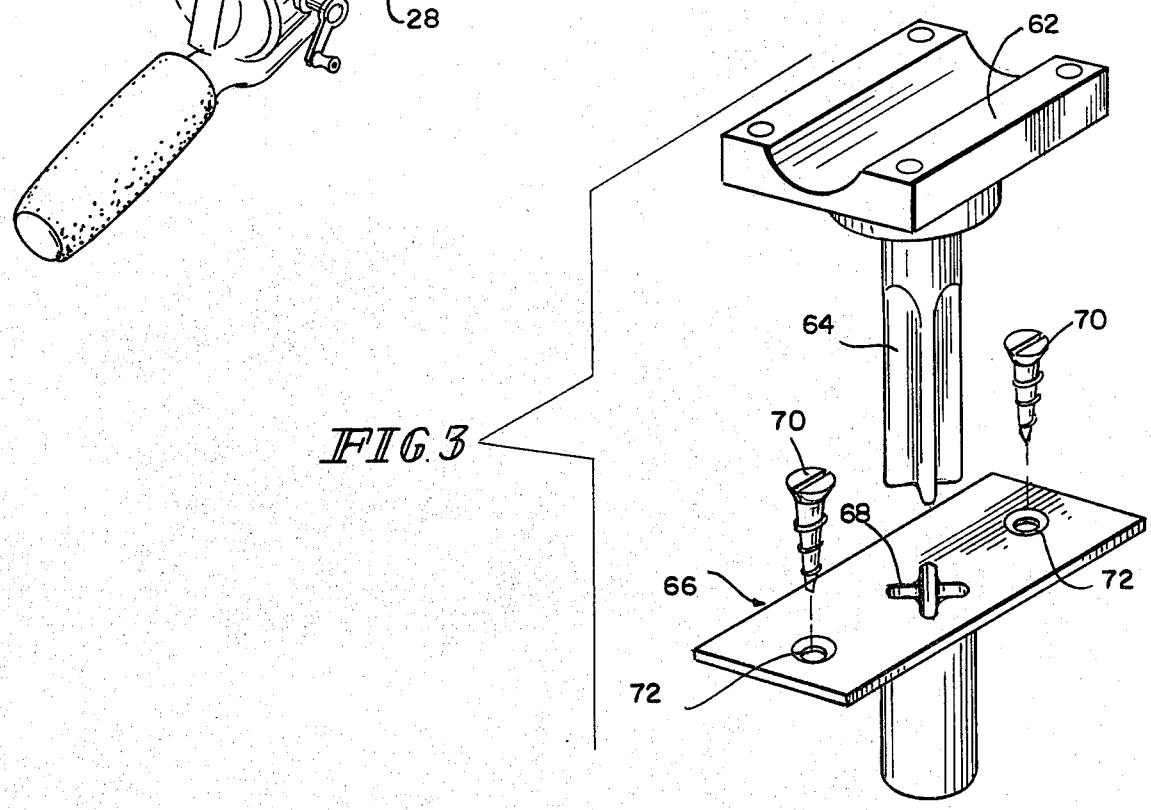

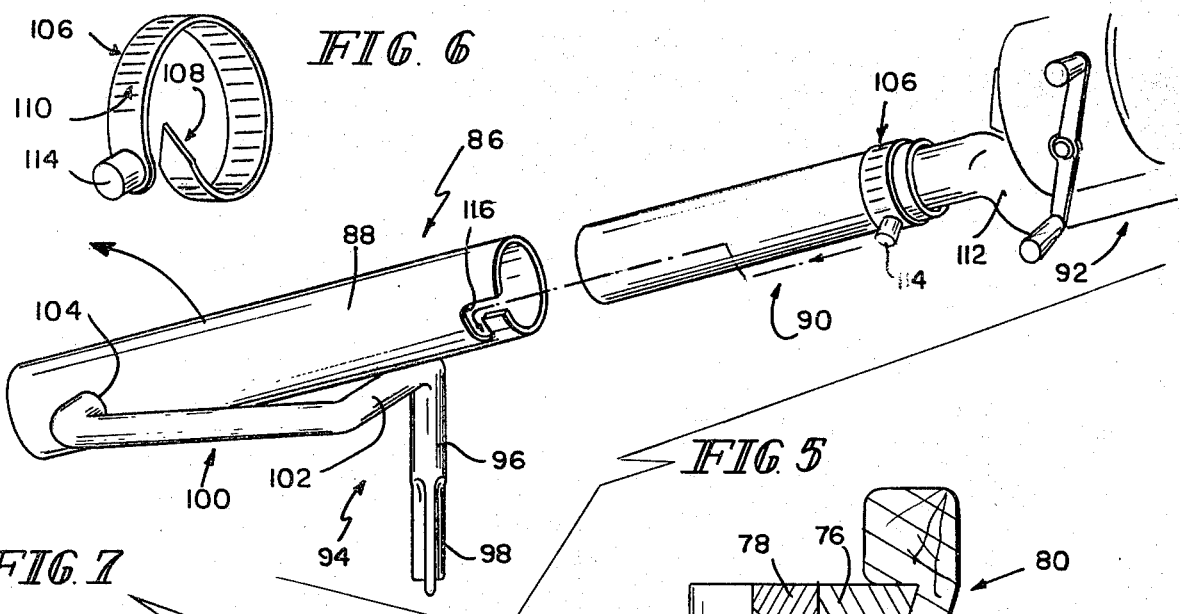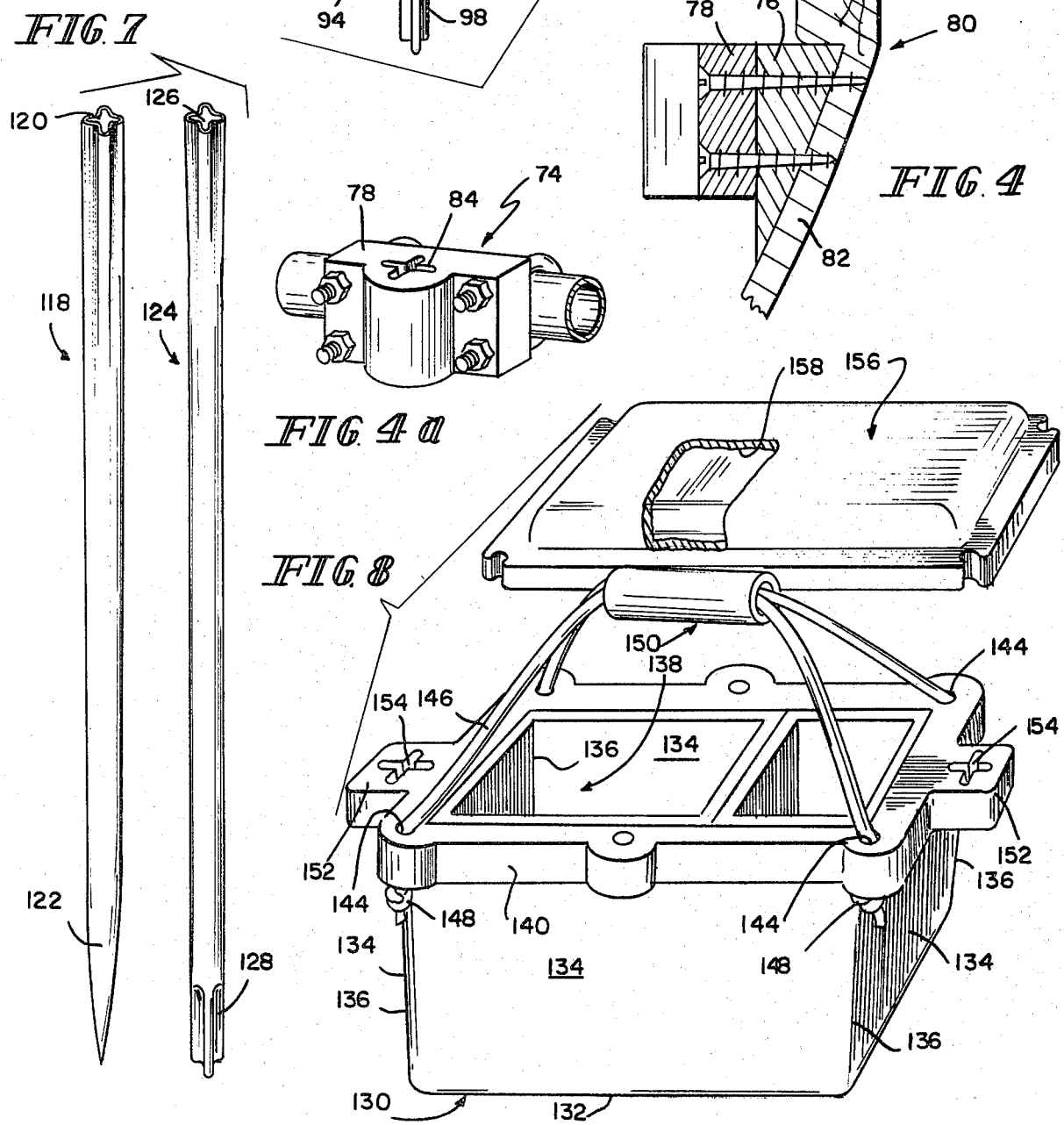

FISHING ROD HOLDER

This invention relates to fishing equipment, and particularly to a group of convenience fishing rod attachments, especially useful by fishermen who fish with multiple poles or rods, leaving one or more of such rods essentially unattended for periods of time.

According to the invention, a fishing rod attachment includes a base for attachment to the rod, a lever arm for supporting a loop of fishing line, means for mounting the lever arm upon the base for movement between a first, or no-strike, position, and a second, or hook-setting, position, means for yieldably urging the lever arm into the second position, and a trigger for holding the lever arm in the first position. The trigger is sensitive to line tension variations to release the lever arm upon sensing of a strike.

According to an illustrative embodiment, the fishing rod attachment includes an adapter for converting the base from a rod attachment to a boat attachment, the adapter including a plate for connecting to the base, a lock for engaging the adapter, and means for mounting the lock on a boat. The illustrative lock includes means providing an opening, and the adapter includes a stem, with the opening and stem having generally cross-shaped sections transverse to their longitudinal extents.

According to another aspect of the present invention, a fishing rod attachment includes a first portion for attachment to the rod, a lock portion for mounting on a boat, and means for cooperative selective engagement on the first portion and lock to permit a user of the rod to position it securely in the lock.

According to an illustrative embodiment of this aspect of the invention, the means for cooperative selective engagement includes a stem provided on the first portion, and the lock provides an opening sized to engage the stem. Again, illustratively, the lock opening and stem have generally cross-shaped sections transverse to their longitudinal extents.

In yet another aspect of the invention, a fishing rod attachment includes a first portion for retaining a butt and handle portion of the fishing rod, the first portion having a generally cylindrical configuration, and a stem portion having a first section. The stem portion further includes a second section which is generally perpendicular to the first section and is pivotally connected to the first portion. The second section provides a region upon which the first portion rests in a use position and away from which the first portion is pivotal to aid in insertion and removal of the rod from the first portion. The first portion further includes, at an end thereof remote from the pivotal connection, a somewhat L-shaped slot. A projection on the rod handle engages into the somewhat L-shaped slot to lock the rod handle and first portion together selectively in a somewhat bayonet-type fastening arrangement, to prevent inadvertent disengagement of the rod from the rod attachment.

In an illustrative embodiment of this aspect of the invention, the first section of the stem portion has a generally cross-shaped section transverse to its longitudinal extent.

To extend the flexibility of these various attachments, the apparatus includes an extension having an opening at one end, with the opening in the extension having a transverse section to engage the stem. Additionally, according to an illustrative embodiment of the extension, the extension has a stem region at its other end, the stem region of the extension having a transverse section for insertion into a similarly shaped opening.

According to yet another aspect of the invention, a fishing rod holder includes a base for resting upon a surface such as a bank or shore of a body of water, a portion for engaging and retaining a fishing rod, one of the base and rod-retaining portions providing an opening, the other of the base and rod-retaining portions providing a stem, and the opening having a transverse section for engaging the stem.

According to an illustrative embodiment of this aspect of the invention, the base comprises a bottom wall, and a plurality of generally upstanding, joined side walls defining a storage cavity. Further, this apparatus includes a removable top wall forming a lid for the cavity. Illustratively, the bottom wall, side walls, and top wall include thermally insulative materials. One of the upstanding side walls includes means providing the opening. Typically, this opening-providing means is an outstanding "ear" or flange region adjacent the vertically upper extent of the side wall. Again, an illustrative opening has a generally cross-shaped section transverse to its longitudinal extent to permit its use with the other attachments disclosed.

The invention may best be understood by referring to the following description and accompanying drawings which illustrate the invention. In the drawings:

FIG. 1 is a perspective view of a device constructed according to one aspect of the invention;

FIG. 2 is a partly fragmentary perspective view of certain details of the apparatus illustrated in FIG. 1;

FIG. 3 is a perspective view of an apparatus constructed according to an aspect of the invention;

FIG. 4 is a perspective view of an apparatus constructed according to an aspect of the invention;

FIG. 4a is a perspective view of an apparatus constructed according to an aspect of the invention;

FIG. 5 is a perspective view of an apparatus constructed according to an aspect of the present invention;

FIG. 6 is a detail of the apparatus illustrated in FIG. 5;

FIG. 7 illustrates two extensions constructed in accordance with an aspect of the present invention; and FIG. 8 illustrates another apparatus constructed according to an aspect of the present invention.

Turning now to FIGS. 1 and 2, a fishing rod 12 includes a conventionally mounted reel 14, such as a closed-face spinning (spin-casting) reel, and an automatic hook-setting attachment 16. Attachment 16 includes an upper, somewhat box-shaped metal supporting framework member 18 and a lower clamp member 20 secured together by screws 22 and wing nuts 24 about the base 26 of rod 12 near its attachment to the rod handle portion 28. Rod 12 includes a plurality of line guides 30 spaced along its length, and a tip guide 32 at its end remote from handle portion 28.

With particular reference to FIG. 2, the upper metal support framework member 18 comprises a generally U-shaped channel section 34 and an upper clamp member 36. Clamp members 20, 36 cooperate to define between them a generally right circular cylindrical space 38 in which the rod 12 is clamped when the wing nuts 24 are tightened on screws 22. To permit use of the hook-setting attachment 16 on rods having different diameters, a small-diameter rod spacer 40 and a large-diameter rod spacer 42 are provided. Both of spacers 40, 42 are in the configuration of hollow right circular cylinders split lengthwise along diameters to surround the base 26 of the rod 12 adjacent handle portion 28.

Turning now specifically to the construction of the attachment 16, the channel section 34 is provided with upstanding walls 44, 46, between which a pivot pin 48 extends. A hook-setting, or lever, arm 50 is mounted on pin 48 for pivotal motion about the axis of pin 48. Lever arm 50 is biased into an essentially upright, strike, or hook-setting orientation (illustrated in broken lines in FIG. 1) by a spring 52 which is wound about pin 48. A trigger 54 is relatively freely movably attached to an upper forward corner of wall 44. A latch groove 56 is provided in the upper forward corner of the other wall 46.

In the operation of the device illustrated in FIGS. 1 and 2, fishing line 58 is paid off the reel 14 through the lower center of channel section 34 (i.e., beneath spring 52), through the line guide 30 closest to handle portion 28, through a tip guide 60 provided on the end of lever arm 50, and then through the next line guide 30 on rod 12 and so on to tip guide 32. A bait is then affixed to the end of line 58. The bait is cast with the arm 50 in either its position illustrated in solid lines in FIG. 1 or in broken lines in FIG. 1. Once the bait is cast, the arm 50 is placed in its position illustrated in solid lines in FIG. 1 and held against the urging of spring 52 by placing trigger 54 across the top of arm 50 and into the latching groove 56. The fishing line between tip guide 60 and the second line guide 30 from handle portion 28 is looped over the free end of trigger 54. When a fish strikes the bait, the trigger 54 senses the increased tension in the fishing line 58 and is tripped by this increased tension. Arm 50 pivots under the urging of spring 52 and sets the hook in the mouth tissue of fish. This prevents the fish from swallowing the bait, resulting in a complicated disgorging procedure and almost sure injury to the fish, even though the rod 12 is unattended at the time the fish strikes.

Turning now to FIGS. 3 and 4, a fisherman may not desire to leave his unattended rods lying in the bottom of the boat from which he is fishing. To this end, a lower clamp member 62 provided with a depending stem 64 can be used to replace the lower clamp member 20 of FIGS. 1 and 2. Stem 64 has a somewhat cruciform, or cross-shaped, section transverse to its longitudinal extent. A lock 66 having a similarly cruciform-shaped opening 68 is provided for attachment to a boat, such as a bass boat, by screws 70 which attach to the boat through openings provided in a mounting plate 72 to which the lock 66 is affixed.

Another illustrative form of lock is the lock 74 illustrated in FIG. 4. Lock 74 includes a wedge-shaped spacer 76 and a portion 78 which cooperate to attach the lock 74 to the gunwale 80 of a boat 82 (illustrated only fragmentarily). Spacers 76 having different configurations can be provided to match different boat gunwale contours. Portion 78 is provided with an opening 84 of cross-shaped section transverse to its longitudinal extent. This opening 84 is of a shape to receive the stem 64 illustrated in FIG. 3. Using either of locks 66, 74, an angler can quickly and easily secure an unattended rod to a fishing boat, while at the same time permitting the angler to retrieve and manipulate the rod, should he have a strike. Portion 78 can also be used with U-bolts and nuts to clamp portion 78 to the gunwale of a boat or around a pipe or handrail on a boat, a dock, or the bank or shore of a body of water. See FIG. 4a.

Another useful attachment is that illustrated in FIGS. 5 and 6. With reference to FIG. 5, the attachment 86 includes a first, generally right circular cylindrical portion 88 for receiving and holding the butt and handle portion 90 of a rod 92. The attachment 86 also includes a stem portion 94 having a first section 96, the lower end 98 of which is generally cross-shaped in section transverse to its longitudinal extent. Upwardly from the first section 96, the stem 94 is bent to form a second section 100 which is generally perpendicular to the section 96 and includes a rest region 102. Second section 100 extends rearwardly and at right angles again from rest region 102 toward the rearward end of the cylindrical portion 88 where it enters the rearward end of cylindrical portion 88 at 104 and is pivotally connected thereto. This pivotal connection permits the cylindrical portion 88 to be pivoted upward from the rest position illustrated in which it lies upon the rest region 102. This facilitates placement of the butt and handle portion 90 of rod 92 in the cylindrical portion 88 and removal of the rod 92 from cylindrical portion 88.

To ensure that the rod 92 remains secure in attachment 86, a flexible plastic adjustable strip 106 is provided. Strip 106 is of sufficient length that the free end 108 of strip 106 can be inserted through a slot 110 provided on strip 106 and drawn tight about the handle portion 90 of rod 92 adjacent where the handle portion 90 joins the reel seat 112 of rod 92. Strip 106 is further provided with a generally right circular cylindrical solid plastic projection 114 which is molded onto the strip 106 for ruggedness. Projection 114 cooperates with a generally L-shaped slot 116 provided in the forward end of cylindrical portion 88 to form a bayonet-type coupling between the rod 92 and the attachment 86. Under certain circumstances, strip 106 may not be required. Many rods are equipped with finger rests. The finger rest of a rod can be inserted into an appropriately shaped slot 116. Certain fishing reels, such as open-faced spinning reels, include stems from which the reels hang. Such stems can also be inserted into appropriately shaped slots 116.

The portion 98 of stem 94 is shaped for insertion into the opening 68 of lock 66 (FIG. 3) or the opening 84 provided in lock 74 (FIG. 4). However, under certain circumstances, a fisherman may not be fishing from a boat, but rather from the bank or shore of a body of water. For this purpose, the extensions illustrated in FIG. 7 are useful. Extension 118 is provided at one end with an opening 120 having a cross-shaped section transverse to its longitudinal extent for receiving a stem such as stem 64, illustrated in FIG. 3, or stem 94, illustrated in FIG. 5. The other end 122 of extension 118 is pointed so that it may be forced into the soil on the bank or shore of a body of water. This extension 118 can be used to secure an unattended rod on the bank or shore. It has the added advantage of keeping the rod off the soil or vegetation on the bank or shore.

The other extension 124 illustrated in FIG. 7 has an opening 126 at one of its ends. Opening 126 is generally cross-shaped in section transverse to its longitudinal extent to receive a stem such as stem 64 illustrated in FIG. 3 or stem 94 illustrated in FIG. 5. The other end 128 of extension 124 is formed into a stem having a cross-shaped section transverse to its longitudinal extent. This enables extension 124 to be used, for example, between stem 64 (FIG. 3) or stem 94 (FIG. 5) and lock 66 (FIG. 3) or lock 74 (FIG. 4).

Under certain circumstances, when a fisherman is fishing from the bank or shore of a body of water, it is not possible to use an extension such as extension 118 in FIG. 7. This might occur, for example, where the bank or shore is quite rocky, or where it is covered by a pavement such as a boat ramp. For these situations, the device illustrated in FIG. 8 is provided. This device includes a base 130 in the form of a bottom wall 132 and four generally vertically upstanding side walls 134 joined at adjacent corners 136 to each other and to bottom wall 132. Conveniently, the bottom wall 132 and side walls 134 are formed from rigid structural cellular plastic foam which is thermally insulative so that the structure 130 can function as a cooler. The cavity 138 of the cooler can be divided as desired. In FIG. 8, it is illustrated as divided into two sections, one larger and one smaller, for canned beverages and bait. A flange 140 is provided around the vertically upper extents of side walls 134. At the corners 132, vertical passageways 144 are provided. Rope 146 is passed through these passageways 144 and knotted, as at 148, to form a rope handle 150 for the cooler. Flange 140 also is provided with ears 152 at its opposite ends. Openings 154 extend vertically through the ears 152. Openings 154 have the same cross-shaped sections transverse to their longitudinal (vertical) extents as do the openings 68 (FIG. 3), 84 (FIG. 4), 120 and 126 (FIG. 7) for the same reason. That is, the base 130 can be used to position unattended fishing rods securely, even where extensions such as extension 118 or locks such as lock 66 (FIG. 3) or lock 74 (FIG. 4) cannot be used. Since the base 130 as illustrated also functions as a cooler, a lid 156 is provided therefor. The illustrated lid 156 includes a pocket 158 for a freezable heat sink, such as the commercially available BLUE ICE pack.

What is claimed is:

1. A fishing rod attachment including a first portion for retaining a butt and handle portion of the fishing rod, a stem portion having a first section, a second section which is generally perpendicular to the first section and is pivotally connected to the first portion and provides a region upon which the first portion rests in a use position and away from which rest region the first portion is pivotal to aid in insertion and removal of the rod from the first portion, the first portion further including, at an end of the cylinder remote from the pivotal connection, a somewhat L-shaped slot, and a strap adjustably attached to the handle portion of the fishing rod having a projection for engagement into the slot to lock the rod handle and the first portion together selectively to prevent inadvertent disengagement of the rod from the rod attachment.

2. The apparatus of claim 1 wherein the first section of the stem portion has a cruciform section transverse to its longitudinal extent.

3. The apparatus of claim 1 and further comprising an extension having an opening at one end, the opening in the extension having a transverse section to engage the stem.

4. The apparatus of claim 3 wherein the extension has a stem region at its other end, the stem region of the extension having a transverse section for insertion into a similarly shaped opening.

5. The apparatus of claim 1 wherein the strap comprises a flexible plastic strip provided with a generally right circular cylindrical solid projection unitarily molded thereto.

6. The apparatus of claim 1 wherein the strap comprises a strip of flexible plastic of sufficient length to more than surround the handle of the fishing rod, the strip having a slot through which a free end of the strip is inserted and drawn tight to secure the same.

* * * * *